3,069,316
METHOD AND COMPOSITIONS FOR TREATMENT OF HEXAMITOSIS
Gilbert Fred Otto, Lake Bluff, Ill., assignor to Abbott Laboratories, North Chicago, Ill., a corporation of Illinois
No Drawing. Filed June 19, 1961, Ser. No. 117,816
6 Claims. (Cl. 167—53)

This invention relates to a method and compositions for the treatment of fish disease and more particularly, it relates to compositions containing fumagillin and a method for employing the same to treat trout and salmon infected with hexamitosis.

Hexamitosis is an enteric parasitic infection of trout and salmon. The causative organism is a flagellate known as *Hexamita salmonis*. With the inevitable crowding of young fish in hatcheries, there is ample opportunity for massive exposure. Artificial conditions, including artificial feed, create various stress factors which increase susceptibility to the infection. Mortality rates in hatcheries from the disease alone run as high as 50 to 75% in young fry or fingerlings and on occasion newly hatched trout have been completely wiped out. In the past, mercurous chloride or p-ureidobenzenearsonic acid have been employed in fish feed to treat the disease. However, neither of these remedies is dependable or satisfactory.

All species and varieties of trout and salmon appear to be susceptible to hexamitosis. It is usually evident as chronic wasting disease, which runs its course in a matter of weeks accompanied by a high death rate. The fish fail to grow and lose weight. They are listless, often lying on the bottom and occasionally make quick spastic movements from side to side. Upon microscopic examination, flagellates are found in the intestinal contents of the sick fish. An acute outbreak of the disease may become manifest only by the rapid death rate since 50% or more of the fish die within 24 to 48 hours of the first sign of the disease.

The problem of controlling hexamitosis is becoming more serious since trout hatcheries are rapidly increasing for the production of marketable fish and the stocking of fee fishing ponds as well as the increasing amount of trout hatching by governmental agencies for stocking national waters for sport fishermen. There are now about 150 large hatcheries in the United States alone and many smaller ones producing edible trout on a commercial basis. The development of pelletized dry fish feed in the past decade has accelerated the growth of the industry. Not less than 30,000 tons of such feed is currently sold annually for trout and salmon raising. This market should double by 1965 and increase ten fold by 1975. As the trout industry grows, there will be increasing numbers of problems of disease control of which the most serious at present is hexamitosis. It would, therefore, be beneficial to develop methods and compositions which are effective against this disease.

It is the main object of this invention to provide a method for the treatment of hexamitosis in trout and salmon. A further object is to provide compositions containing fumagillin which are very effective in eradicating hexamitosis in trout and salmon.

It has now been discovered that fumagillin is extremely active against the flagellate *Hexamita salmonis*, the causative organism of hexamitosis in trout and salmon. The previous known activity of fumagillin was against completely unrelated protozoan organisms. It is effective against one amoeba organism *Entamoeba histolytica* in man, *Nosema apis* in bees but inactive against bacteria, fungi, viruses and other closely related protozoa. More specifically, it has no activity against such pathogenic flagellates as *Trichomonas vaginalis, Trichomonas foetus, Trypanosoma gambiense* and *Spirochoeta vovyi*. Thus, it was most unexpected that fumagillin would be active against the related flagellate, *Hexamita salmonis*.

Fumagillin is a well established antibiotic. It can be readily prepared as described in U.S. Patent 2,803,586 by fermenting *Aspergillus fumigatus* under submerged aerobic conditions in a suitable nutrient medium and isolating the fumagillin from the culture medium by extraction with a suitable solvent.

The method of treatment of the present invention involves incorporating fumagillin in pelletized fish feed and providing these medicated pellets of feed to fish naturally infected with hexamitosis for limited periods of time. In general, about 0.01 to 1.0% by weight of fumagillin in the diet is employed but about 0.2% by weight is preferable from the standpoint of effectiveness, toxicity and palatability. The continuous feeding of from 0.001 to about 0.002% by weight of fumagillin in the diet provides a good prophylactic practice for preventing hexamitosis infection in healthy trout and salmon.

In one test, fumagillin was incorporated in a concentration of 0.2% by weight into a commercial trout feed containing meat meal, ground corn, soybean oil meal, fish meal, dried buttermilk, brewer's yeast and minor amounts of vitamins and essential minerals having an analysis of 56% protein, 4% fat and 5% fiber. The medicated feed was fed twice daily for five days to 150 salmon fingerlings naturally infected with hexamitosis. All of the treated salmon were completely free of parasites at the end of the test period whereas the control group which was untreated was heavily infested with parasites of *Hexamita salmonis*.

In another test, fumagillin was fed to salmon infected with hexamitosis in a concentration of 1.0% of the feed as described above. Equally good results were obtained in that the treated fish were devoid of the parasites within 5 days while the untreated control group was heavily infested with parasites causing the disease.

In still other tests, the parasite causing hexamitosis was completely eliminated from trout within 5 days or less when the fish were fed fumagillin in amounts ranging from 0.01 to 0.04% by weight of their diet.

A direct comparative study of fumagillin with mercurous chloride and p-ureidobenzenearsonic acid against hexamitosis in salmon fingerlings revealed that only fumagillin was effective in eliminating the infection at 0.2% by weight or less in the diet. There were no toxic effects upon the host even at a concentration of 1% by weight of the diet. In contrast, mercurous chloride was completely inactive at 0.2% and toxic at 1.0% in the diet whereas p-ureidobenzenearsonic acid was effective at only 1% by weight in the diet. In similar tests, other antibiotics such as erythromycin and chlorotetracycline were ineffective against hexamitosis when employed at a concentration of 0.2% by weight in the diet of salmon.

What I claim is:
1. A method for treating salmon and trout to prevent and control hexamitosis which comprises feeding said fish a composition containing fumagillin.
2. A method as claimed in claim 1 in which the fumagillin is mixed with a solid carrier.
3. A method as claimed in claim 1 in which the fumagillin is present in an amount of from about 0.1% to 1% by weight of the composition.
4. A method as claimed in claim 1 in which the fumagillin is present in an amount of about 0.2% by weight of the composition.
5. A fish feed useful for the control of hexamitosis containing from 0.01 to 1% by weight of fumagillin.
6. In the practice of pisciculture, the method which comprises feeding fish a solid composition containing from 0.001 to about 0.002% by weight of fumagillin to prevent hexamitosis.

References Cited in the file of this patent

Lund: Yearbook of Agriculture 1956, pp. 444–446, U.S. G.P.O.

Hussar: Antibiotics and Antibiotic Therapy, 1954, Macmillan Co., N.Y., pp. 377 and 378.